UNITED STATES PATENT OFFICE.

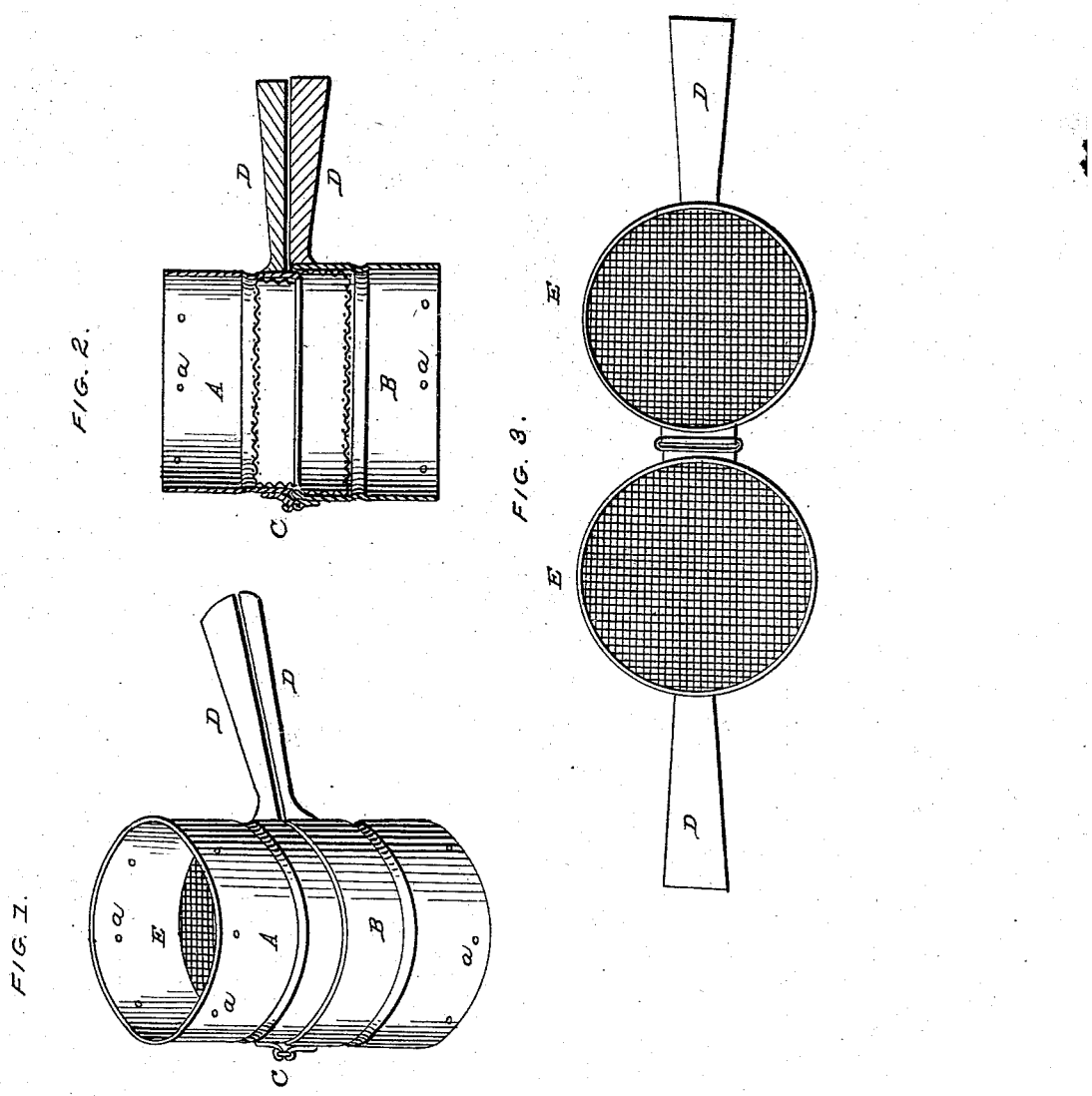
P. PLANT.
Coffee Roaster.
No. 56,861.
Patented July 31, 1866.

PASCAL PLANT, OF WASHINGTON, DISTRICT OF COLUMBIA, ASSIGNOR TO HIMSELF AND PETER HANNAY, OF SAME PLACE.

COFFEE-ROASTER.

Specification forming part of Letters Patent No. 56,861, dated July 31, 1866.

*To all whom it may concern:*

Be it known that I, PASCAL PLANT, of Washington, in the county of Washington and District of Columbia, have invented a new and Improved Coffee-Roaster; and I do hereby declare that the following is a full and exact description thereof, reference being had to the accompanying drawings, and to the letters of reference marked thereon.

Figure 1 is a perspective view. Fig. 2 is a vertical section, and Fig. 3 is a plan of the roaster when opened, showing the internal arrangement thereof.

Similar letters refer to similar parts in each figure.

A and B are metallic cylinders, (or they may be made of clay or other material,) open at both ends. Said cylinders are connected by the hinge C in the manner shown in the drawings. The cylinder B is large enough to accommodate the inner end of the cylinder A, over which it passes in the manner of an ordinary box-cover. Within each of the cylinders is placed the wire-gauze or perforated plate E, in the manner represented in the drawings, leaving a space between the heated surface on which the roaster is placed and the coffee or whatever is being roasted.

On the outside of the cylinders, opposite the hinge C, is attached the handle D. This handle consists of two sections, one of which is attached to each of the cylinders, and serves to open and close the roaster and to change its position when in operation.

Through the cylinders, near the outer ends thereof, are small holes *a a a*, to admit of a circulation of air during the process of roasting.

My invention may be used not only for roasting coffee, but also for toasting bread, popping corn, roasting nuts, sifting meal, and for many other uses to which it will naturally suggest itself.

I do not intend to confine myself to the construction of roasters cylindrical in form, but may make them square or of any other desirable form.

The operation of my roaster is as follows, viz: The cylinders being separated, as represented in Fig. 3, the coffee or whatever it is desired to roast is placed in one of the cylinders in the space between the wire-gauze or perforated plate and the inner end thereof. Then, by means of the handles, the cylinders are brought together, as represented in Figs. 1 and 2. A cover may be used, if deemed advisable. One of the open ends of the roaster is then placed on a hot stove or other place for heating, occasionally inverting it and placing the other end over the heat.

The advantages derived from a roaster constructed as described are, that whatever is roasted in it is not carbonized, as it would be if roasted in contact with a hot surface, and thus, while developing, does not volatilize the fine flavor and aroma peculiar to coffee. The process of roasting, &c., may be observed at any time without opening the roaster, and it may be so cheaply constructed as to be within the means of every family.

From the foregoing description of my invention, it will be apparent that its principle consists in roasting the coffee and other material by incasing it within a chamber and so supporting it on a perforated plate or wire-gauze during the operation as to leave a space between the coffee and the fire or radiating-surface, and of inserting a series of holes in the side of the chamber between the gauze or perforated plate and the fire or heated surface for the admission of air, so that the air so admitted shall be heated and form, in connection with the radiated heat of the stove or fire, the means of parching or roasting the coffee, for which purpose the air is forced, by its expansion from heat, to pass through the gauze or perforated plate and the coffee, and to make its escape through the meshes of the gauze of the upper cylinder into the open air, or, where a cover is used, through the openings *a a a* of the upper cylinder, or through holes in the cover itself, from which it will be self-evident that a single one of the cylinders A or B may be used for the same purpose simply by making it of the proper capacity and so arranging the wire-gauze or perforated plate E E as to leave sufficient space on the upper side for holding the coffee to be roasted and the necessary space below, between it and the fire or heated surface, and then piercing two series of holes, one on each side of the gauze, the one below for the admission of the air to be heated for the parching or roasting of the coffee, and the other above for its escape and that of the gases or vapors generated during the process; but while this form of my invention may answer a very good purpose, still it is not quite so convenient, nor does it possess as many advantages as that of the two combined cylinders and perforated plates.

Having thus described my invention, what I claim as new, and desire to secure by Letters Patent, is—

The cylinders A and B, either singly or combined, when used in combination with wire-gauze or perforated plates E E and openings $a\ a\ a$, arranged in the manner substantially as and for the purpose set forth.

PASCAL PLANT.

Witnesses:
CHARLES HERRON,
E. MOULTON.